June 29, 1937.   P. BEVIS   2,085,180
LIPSTICK DEMONSTRATING DEVICE
Filed May 14, 1936   2 Sheets-Sheet 1

INVENTOR.
Palmer Bevis
BY
his ATTORNEY.

June 29, 1937.  P. BEVIS  2,085,180
LIPSTICK DEMONSTRATING DEVICE
Filed May 14, 1936  2 Sheets-Sheet 2

INVENTOR.
BY  Palmer Bevis
his ATTORNEY.

Patented June 29, 1937

2,085,180

UNITED STATES PATENT OFFICE 2,085,180

LIPSTICK DEMONSTRATING DEVICE

Palmer Bevis, New York, N. Y.

Application May 14, 1936, Serial No. 79,713

15 Claims. (Cl. 35—59)

My invention relates to devices adapted for testing lipsticks and similar materials and refers particularly to devices which are especially adapted to test the appearance which the lipstick or the like will produce with reference to the face of the prospective user without the necessity of making any direct application thereof to the lips.

Although there has been a demand for a device of this nature and some attempts to provide it have been made, I do not know of any such device which satisfactorily fulfills the requirements and none is now in general or extensive use.

The lipstick testing device of my invention is particularly adapted for use in stores. It permits a customer to select and choose lipsticks of the most suitable color, tint, or shade for her own individual type of beauty, and under different lighting effects, before buying the lipsticks.

In general my device comprises a lip representation, in the form of a film-like picture of a pair of lips in a lipstick color. This representation is so disposed that the prospective customer can position her own lips close to it. Then she can view the composite image of her face and the pictured lip representation in a suitably spaced mirror in the device.

She can readily position her face so that her own lips will be covered and concealed by the lip representation, thereby giving the appearance and creating the illusion that her own lips have lipstick on them of the kind being thus tested.

The lip representation is carried by a transparent slide. A plurality of such slides are provided, to constitute a set, each of which carries a pictured lip representation of a different coloration, corresponding with the different lipsticks on sale.

Means are provided for subjecting the face to different lighting effects, such as one simulating daylight and another which reproduces usual artificial lighting.

My invention will be clearly understood from a consideration of the following particular description taken in connection with the accompanying drawings, illustrating modified forms, and in which similar parts are designated by similar numerals.

Figure 1:
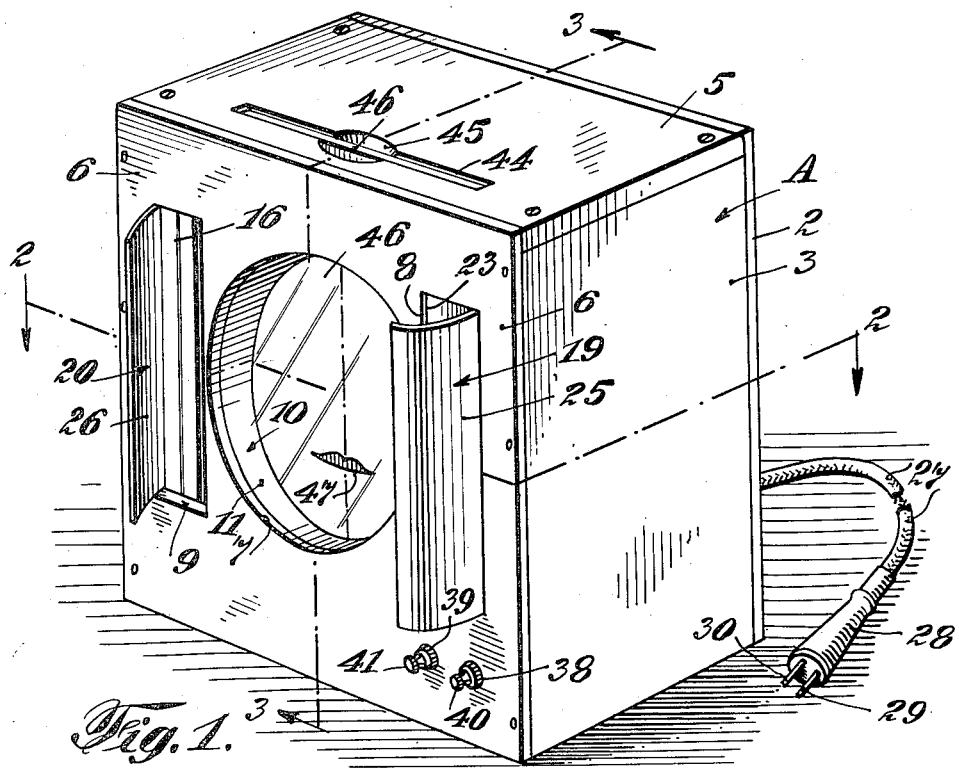
Figure 1 is a front perspective view of one form of the lipstick testing device of my invention.

The particular form of the lipstick testing device of my invention illustrated in Figures 1 to 4 inclusive of the accompanying drawings has a rectangular casing box or cabinet A consisting of a bottom closure 1, a back wall 2, similar right and left side walls 3 and 4, a removable top closure 5, and a removable front wall 6, all suitably secured together. This cabinet A may be made of wood, or other suitable material, or materials.

In its middle portion, the front wall 6 is provided with an oval face opening or sight opening 7, with its narrower end at the bottom. Similar vertically elongated right and left light openings 8 and 9 are provided through the front wall 6 at the sides of the face opening 7, with their inner edges close to the latter. The openings 8 and 9 are shown as of the same length as the opening 7 and as being laterally aligned therewith.

A thicker inner supplemental front wall member 10 is fixedly secured in place to form a backing for the front outer wall 6, and may be of wood or other suitable material. It completely surrounds the face opening 7 of the front wall 6 and has through it a similar face opening or sight opening 11 which registers with and forms an inward continuation of the opening 7. This backing member is shown in Figure 3 as secured to the cabinet bottom 1, thus providing for the separate removal of the front wall 6.

Figure 2:
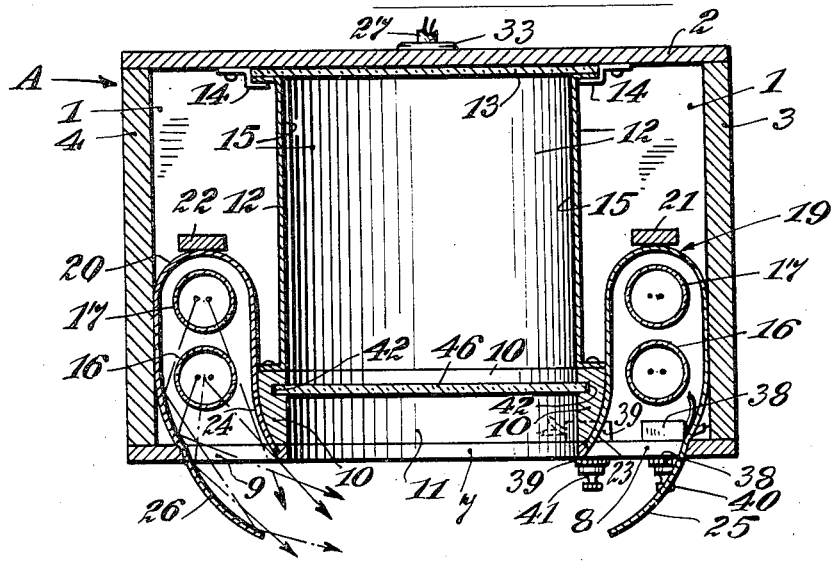
Figure 2 is a central horizontal section on the line 2—2 of Figure 1.
Figure 3:
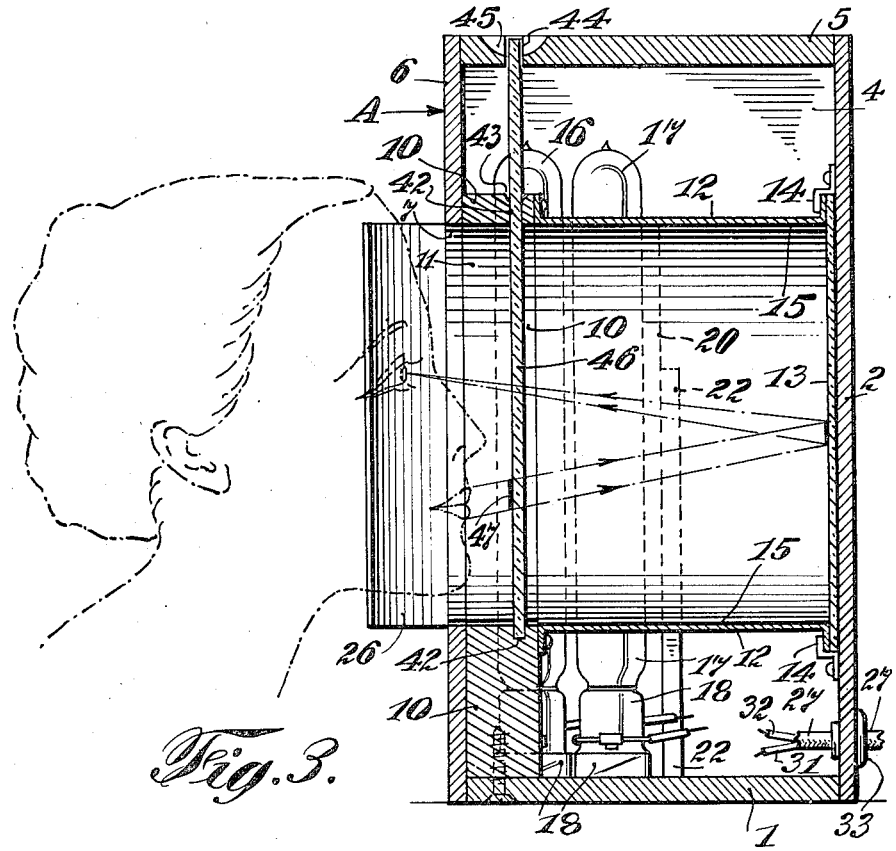
Figure 3 is a central vertical section on the line 3—3 of Figure 1.

A tubular member 12, of the same internal oval shape and size as the front openings 7 and 11 and in aligning registration therewith, extends rearwardly from the backing member 10, having its forward end flanged outwardly and secured to the latter, as shown in Figures 2 and 3. This tubular member 12 may suitably be of sheet metal, or of other material, such as fiber or the like.

The rear end of this tubular member 12 is flanged outwardly and abuts against the marginal portion of a similarly shaped flat mirror 13 the back of which lies against the inner face of the rear wall 2 of the cabinet. The rear end of the hollow member 12 and the mirror 13 are both securely held in place by means of a suitable number of metal clips 14—14 secured to the back wall 2, as shown in Figures 2 and 3. These clips extend past the edges of the mirror and the flange on the tube 12 and firmly clamp against this flange.

The inner face of the tubular member 12 is finished with a dull black coating 15, so as not to produce any glare of light reflected from the mirror 13, or coming from other sources.

The tubular member 12 is made of the proper length for clear vision of the reflected image of the face when it is framed in the front opening 7, as shown in Figure 3, it being necessary, of course, that the front portion of the face is subjected to proper illumination. Special means are provided for lighting the face, with different kinds of light, as desired.

In the particular lighting means illustrated, four similar long, slender, cylindrical electric light bulbs 16—16 and 17—17 are employed. The bulbs 16—16 are within the front corners of the cabinet A, respectively rearward from the laterally outer portions of the light openings 8 and 9. The bulbs 17—17 are respectively at the rear of the bulbs 16—16. The bulbs 16—16 and 17—17 extend vertically and are shown as extending a short distance both above and below the tubular member 12.

In the particular arrangement of bulbs shown, the front bulbs 16—16 are ordinary, or usual, bulbs and the bulbs 17—17 are what are commonly known as "daylight bulbs". These daylight bulbs 17—17 could be placed at the front, with the ordinary bulbs 16—16 at the rear of them, if so desired.

Similar sockets 18—18 for the bulbs 16—16 and 17—17 are mounted upon the bottom 1. Similar forwardly-opening right and left reflectors 19 and 20 extend respectively at the rear, at the sides and forwardly beyond each pair of lamps or bulbs 16—17 and 16—17. These reflectors are longitudinally straight and transversely of a U-shape in their rear portions. They are coterminous in length with the light openings 8 and 9 in the front wall 6. They are both alike and are relatively reversed in position.

The reflectors 19 and 20 respectively open forwardly through the light openings 8 and 9. These reflectors are removably positioned by the edges of the light openings 8 and 9, by the sides of the inner frame member 10, by the cabinet side walls 3 and 4, and by means of similar upright stop bars 21 and 22 which rise from the cabinet base or bottom 1 and form rear abutments for the reflectors 19 and 20 at the back thereof.

The reflector side walls adjacent to the sight tube 12 are provided respectively with forward extensions 23 and 24 which curve toward the sight opening 7 and are shown as having their edges countersunk into the inner edges of the respective light openings 8 and 9, the outer side faces of the inner frame 10 being convexly beveled to accommodate these reflector extensions 23—24.

The reflector side walls which abut respectively against the cabinet side walls 3 and 4 are extended forwardly to form wings 25 and 26. These wings extend out through the sight openings 8 and 9, in engagement with the outer edges of these openings, and are curved partly across these openings forwardly beyond the cabinet front wall 6 and toward its face opening or sight opening 7.

By reason of the curved reflector extensions 23—24 and 25—26, light from the bulbs 16—16, or from the bulbs 17—17, or the two pairs of bulbs 16—17 and 16—17, will be directed by reflection, at various diffused angles, toward the sight opening and outwardly from the front wall 6, as is in part indicated by the arrows in Figure 2, at the left for the reflector 20, thus to illuminate the entire front portion of the face, as indicated in Figure 3, without the light shining directly into the eyes.

Figure 4:
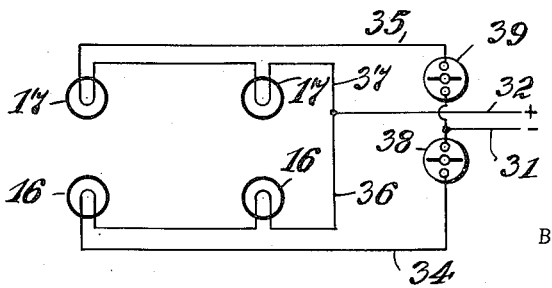
Figure 4 is a diagram of the electrical circuits of the device.

The electrical circuits are clearly shown in Figure 4. An ordinary two-wire cord 27 terminates outwardly in a usual form of plug member 28 which has the conductive prongs 29—30, forming terminals of the cord wires 31—32, and adapted to be plugged into a usual form of current-supplying receptacle. The cord 27 enters the cabinet A through a usual eye or ferrule 33 shown as carried by its rear wall 2 adjacent to the bottom 1.

The wire 31 divides into two branches 34 and 35, and the wire 32 divides into two branches 36 and 37. The branches 34 and 36 are connected through the two ordinary lamp bulbs 16—16, and the other branches 35 and 37 are connected through the two special daylight lamp bulbs 17—17. If so desired, the bulbs 16—16 could be connected in multiple to the branches 34—36 instead of in series with each other as shown, and the same is true of the bulbs 17—17 as to the branches 35—37.

The branches 34—36, which feed the ordinary bulbs 16—16, have therein a single-pole snap switch 38 which is shown as connected into the branch 34, and the branches 35—37 which feed the daylight bulbs 17—17, have therein a single-pole snap switch 39 which is shown as connected into the branch 35. The switches 38 and 39 are shown as mounted upon the right hand lower corner portion of the front wall 6 of the cabinet A, and as having outside finger pieces 40 and 41 by means of which they may be operated in a usual manner.

The inner supplemental front wall or frame member 10 is provided with a slotted guideway or slideway 42 which extends downwardly therein. This slideway extends downwardly past the sides of the sight opening 11 in the form of vertical slots (Figure 2), and to a level below the bottom of this opening 11 in the form of a transverse slot (Figure 3), and forms an upwardly open transverse slot above the top of the sight opening 11 (Figure 3), where its front and rear faces are beveled to form a flaring entrance 43.

For simplicity and clarity of illustration, the guide member 10 is shown as formed of a single piece of material, however, for convenience in manufacture, especially in producing its socketed slideway 42, it is evident that it may consist of two or more pieces firmly secured together.

The cabinet cover or top 5 has through it a transverse slot 44 in alignment with the slideway slot 42 and is hollowed out at the middle of its length to form a finger-receiving recess 45.

A slide formed by a plain transparent glass plate 46, of the correct dimensions, is freely slidable downwardly through the top slot 44 into the pocket formed by the slideway 42, with its lower end then resting upon the bottom of this pocket and with its upper end about even with the upper face of the top 5. This transparent slide 46 may be readily removed by grasping its upper margin in the recess 45 and withdrawing it upwardly.

At the correct position thereon the slide 46 carries a pictured lip representation 47. This lip picture should be so positioned upon the slide that the lips of the observer may be placed as close thereto as is conveniently practical, as indicated in Figure 3. For this reason it is desirable to place the lip representation 47 upon the outer or front face of the glass plate 46.

This lip picture 47 is painted upon the glass 46 in any desired lipstick color, and forms a film thereon, as is clearly indicated in Figure 3, desirably lipstick material itself being used for this purpose. It is evident that the film of the lip picture 47 could be first formed upon some other suitable surface and then transferred, by a well known process, to the surface of the glass slide plate 46, if so desired.

A desired number of slides similar to the slide 46 is provided, to form a set of such slides, each of which carries thereon a painted film forming a representation of a pair of lips similar to the pictured representation 47, but each being of a different color, or shade of color, from each of the others.

The operation of the particular above described lipstick testing device of my invention is as follows:

When a girl looks into the cabinet A through the large front opening 7, as indicated in Figure 3, she will see herself in the mirror 13. The reflected image of her face will, of course, appear to be at the same distance behind the mirror 13 that her face is at the front of it. The spacing between the mirror 13 and the testing slide 46 is made such as to give clear vision with the lips close to this slide.

She can easily position her face so that, in its reflected image, her own lips will be in and will coincide with the lines of sight of the lip representation 47, as is indicated in Figure 3 by the arrowed lines of light from the pictured lips 47 to the mirror 13 and thence back to the eyes. Thus in the viewed image, or observed reflection, the natural lips will be covered by and concealed behind the lip representation 47.

Because of the close proximity of the natural lips to the lip representation 47, only slight adjusting movement of the face will be required. Also this proximity accentuates the illusion of the observer that the pictured lips 47 are actually her own lips. She is thus enabled to judge, under the most favorable conditions, whether or not the lipstick tint, or color, of the lips presented by the imaged picture 47 harmonizes with her complexion, and with the ensemble of her face in general.

Should the first tint, shade, or color of the lipstick thus tested appear to be more or less unsuitable, she removes the particular testing slide 46 and replaces it with another which she may select and which carries a lip representation of a more or less different tint, shade, or color of lipstick, and so on until she is able to choose the particular lipstick that she desires, by observing the actual appearance of the different lipstick colorings upon her own lips, and without having had to apply them to her lips for this purpose.

In making these tests, she switches in the daylight bulbs 17—17 for obtaining and clearly observing a day time, or day lighted, effect. For noting the appearance with usual artificial lighting, she cuts out the bulbs 17—17 and switches on the ordinary lamp bulbs 16—16. Thus she can selectively choose different lipsticks suitable respectively for day use and for night use, or for use under artificially lighted conditions.

The device of my invention is well adapted to be conspicuously placed in stores where lipsticks and the like are for sale, to be conveniently utilized by prospective purchasers, and thus serve as an effective means for promoting sales. It is not only of artistic appearance in general but it has an appearance which will attract and impel people, especially women, to look into it.

A device of my invention constructed substantially as shown in the accompanying drawings has proved to be attractive and successful in operation.

Figure 5:
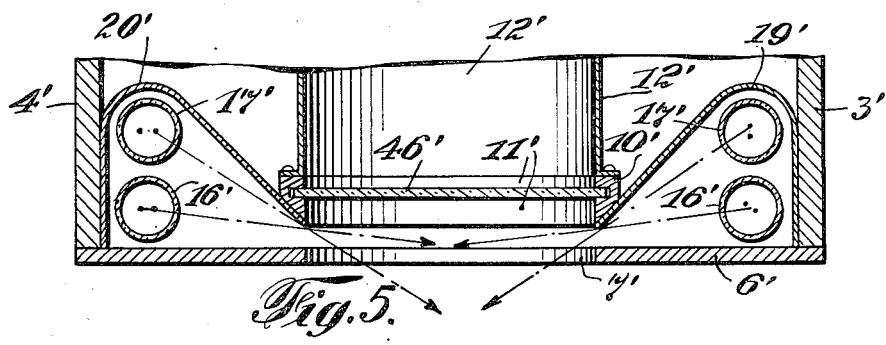
Figure 5 is a horizontal section similar to Figure 2, showing the front portion of a modified form of the device.

The modified form of my device as shown in Figure 5 differs from that described with reference to the preceding figures only with respect to its front wall 6', its inner frame member 10', and its reflectors 19' and 20'.

The front wall 6' is continuous, or of closed formation, at the opposite sides of its face opening or sight opening 7'. The forward faces of the opposite sides of the inner wall member 10' are beveled on flat or straight lines rearwardly away from its sight opening 11', and are spaced rearwardly from the inner face of the front wall 6', thereby to provide light openings, as shown and as indicated by the arrows.

The reflectors 19' and 20' respectively have flat side walls lying against the inner faces of the cabinet side walls 3' and 4' and extended forwardly to the front wall 6'. The other or opposite side walls of these reflectors flare laterally and forwardly toward the tubular sight member 13' and at their forward margins overlap the beveled faces of the inner frame member 10', shown as removably carrying the test slide 46'.

Mounted within the reflectors 19' and 20' are the ordinary light bulbs 16'—16' and the daylight bulbs 17'—17'.

The operation in use is substantially similar to that already described.

It is obvious that various modifications may be made in the constructions shown in the drawings and above particularly described, within the principle and scope of my invention as defined in the appended claims.

I do not specifically limit myself as to materials, size, shape, relative proportions, or arrangement of parts, nor to inconsequential details of construction, these being given simply as a means for clearly describing the device of my invention.

What I claim is:

1. In a lipstick testing device, in combination, a lip representation, means adapted to support it in a stationary position providing for positioning the natural lips in proximity thereto at the front thereof, a mirror, and means adapted to support said mirror in a stationary position at the rear of said lip representation and spaced therefrom sufficiently to reflect a clear composite image of the face with said lip representation constituting the lips upon the face in this image as viewed by the person looking into said mirror.

2. In a lipstick testing device, in combination, a flat mirror, means adapted to support said mirror in a stationary position providing for looking into it, a transparent plate, plate-supporting means adapted for stationarily positioning said plate a distance forwardly from the mirror such that upon looking through this plate an image of the face will be seen in the mirror, and a pictured lip representation carried by said plate in position to be viewed in the mirror as forming the lips of the reflected face.

3. In a lipstick testing device, in combination, a flat mirror, means adapted to support said mirror in a stationary position providing for looking into it, a transparent plate, plate-supporting means adapted for stationarily positioning said plate a distance forwardly from the mirror such that upon looking through this plate an image of the face will be seen in the mirror, and a pictured lip representation carried by said plate in position to be viewed in the mirror as forming the lips of the reflected face, said plate-supporting means being adapted for removably and replaceably holding said plate in its said position of use.

4. In a lipstick testing device, in combination, a flat mirror, means adapted to support said mirror in a stationary position providing for looking into it, a transparent plate, plate-supporting means adapted for stationarily positioning said plate a distance forwardly from the mirror such that upon looking through this plate an image of the face will be seen in the mirror, and a pictured lip representation carried by said plate in position to be viewed in the mirror as forming the lips of the reflected face, said plate-supporting means having a slideway adapted for slidably receiving and positioning said plate and from which said plate may be slidably withdrawn.

5. In a lipstick testing device, in combination, a flat mirror, means adapted to support said mirror in a stationary position providing for looking into it, a transparent plate, plate-supporting means adapted for stationarily positioning said plate a distance forwardly from the mirror such that upon looking through this plate an image of the face will be seen in the mirror, a pictured lip representation carried by said plate in position to be viewed in the mirror as forming the lips of the reflected face, and lighting means adapted for lighting the front of the face from both of its sides.

6. In a lipstick testing device, in combination, a flat mirror, means adapted to support said mirror in a stationary position providing for looking into it, a transparent plate, plate-supporting means adapted for stationarily positioning said plate a distance forwardly from the mirror such that upon looking through this plate an image of the face will be seen in the mirror, a pictured lip representation carried by said plate in position to be viewed in the mirror as forming the lips of the reflected face, lighting means adapted for lighting the front of the face from both of its opposite sides, and means providing for varying the nature of the light received on the face from said lighting means.

7. In a lipstick testing device, in combination, a tubular sight member of a size to expose therein substantially the entire front portion of a human face looking into it, a flat mirror closing the rear end of said tubular member, a removable and replaceable transparent plate adapted to extend across the forward end portion of said tubular member and in proximity to which the front of the face may be positioned at a distance from said mirror such that an image of the face will be seen therein through said tubular member, and a pictured lip representation carried by said plate in position to be viewed in the mirror as forming the lips of the reflected image of the face.

8. In a lipstick testing device, in combination, a tubular sight member of a size to expose therein substantially the entire front portion of a human face looking into it, a flat mirror closing the rear end of said tubular member, a removable and replaceable transparent plate adapted to extend across the forward end portion of said tubular member and in proximity to which the front of the face may be positioned at a distance from said mirror such that an image of the face will be seen therein through said tubular member, a pictured lip representation carried by said plate in position to be viewed in the mirror as forming the lips of the reflected image of the face, a slideway adapted for slidably receiving and positioning said plate and from which said plate may be slidably withdrawn, lighting means adapted for lighting the front of the face from both of its opposite sides, and means providing for varying the nature of the light received on the face from said lighting means.

9. In a lipstick testing device, in combination, a cabinet having a front wall with a sight opening through it dimensioned to expose the front of a face looking into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, an inner frame member providing through it a sight opening forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, and a pictured lip representation carried upon one of the surfaces of said plate and disposed in a position thereon for adapting it to form the lips of the reflected face image.

10. In a lipstick testing device, in combination, a cabinet having a front wall with a sight opening through it dimensioned to expose the front of a face lookng into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, an inner frame member providing through it a sight opening, forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, a pictured lip representation carried upon one of the surfaces of said plate and disposed in a position thereon for adapting it to form the lips of the reflected face image, a plurality of electric light bulbs within the cabinet with at least one of them positioned at each side laterally beyond said sight tube and sight openings, and a reflector at each side of the cabinet adapted to direct the light from said bulbs upon the opposite sides of the front portion of the face.

11. In a lipstick testing device, in combination, a cabinet having a front wall with a sight opening through it dimensioned to expose the front of a face looking into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, an inner frame member providing through it a sight opening forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, a pictured lip representation carried upon one of the surfaces of said plate and disposed in a position thereon for adapting it to form the lips of the reflected face image, a plurality of pairs of electric light bulbs within the cabinet with at least one pair of them positioned at each side laterally beyond said sight tube and sight openings, one of said bulbs in each of said pairs being a daylight bulb and the other being an ordinary lighting bulb, a reflector at each side of the cabinet in common for each said pair of bulbs and adapted to direct the light from each of the bulbs of each said pair upon the opposite sides of the front portion of the face, manually operable circuit controlling means individually in circuit with said daylight bulbs, and other separately manually operable circuit controlling means individually in circuit with said ordinary lighting bulbs.

12. In a lipstick testing device, in combination, a cabinet having a front wall with a sight opening through it dimensioned to expose the front of a face looking into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, an inner frame member providing through it a sight opening forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, a pictured lip representation carried upon one of the surfaces of said plate and disposed in a position thereon for adapting it to form the lips of the reflected face image, a plurality of electric light bulbs within the cabinet with at least one of them positioned at each side laterally beyond said sight tube and sight openings, and a reflector at each side of the cabinet adapted to direct the light from said bulbs upon the opposite sides of the front portion of the face, said bulbs and said reflectors being vertically elongated to extend throughout the vertical limits of said sight tube and sight openings.

13. In a lipstick testing device, in combination, a cabinet having a front wall with a sight opening through it dimensioned to expose the front of a face looking into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, an inner frame member providing through it a sight opening forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, a pictured lip representation carried upon one of the surfaces of said plate and disposed in a position thereon for adapting it to form the lips of the reflected face image, a plurality of pairs of electric light bulbs within the cabinet with at least one pair of them positioned at each side laterally beyond said sight tube and sight openings, one of said bulbs in each of said pairs being a daylight bulb and the other being an ordinary lighting bulb, a reflector at each side of the cabinet in common for each said pair of bulbs and adapted to direct the light from each of the bulbs of each said pair upon the opposite sides of the front portion of the face, manually operable circuit controlling means individually in circuit with said daylight bulbs, and other separately manually operable circuit controlling means individually in circuit with said ordinary lighting bulbs, said bulbs being of elongated cylindrical form disposed to extend at least throughout the vertical limits of said sight tube and sight openings and with one of the bulbs of each of said pairs positioned rearwardly of the other bulb of that pair, and said reflectors being elongated to extend along straight lines throughout the vertical limits of said sight tube and sight openings, said reflectors forming rearwardly closed and forwardly open housings for the respective said pairs of bulbs.

14. In a lipstick testing device, in combination, a cabinet having a front wall with a sight opening through it dimensioned to expose the front of a face looking into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, an inner frame member providing through it a sight opening forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, and a pictured lip representation carried upon one of the surfaces of said plate and disposed in a position thereon for adapting it to form the lips of the reflected face image, said inner frame member being abutted against said front wall with its sight opening forming a rearward continuation of the sight opening of the latter, said front wall having a vertically elongated light opening through it at each of the opposite sides of and extending throughout the vertical limits of its said sight opening, an elongated cylindrical electric light bulb within the cabinet respectively at the rear of and of a length to extend throughout the length of each of said light openings, and a reflector for each of said bulbs forming a housing therefor extending throughout the length of the respective said light openings and opening forwardly through them, the laterally outer wall of each of said reflectors being provided with a wing extension passing through the adjacent light opening beyond the front face of said front wall and curved toward the sight opening of the latter so that said extensions are thus adapted to direct the light from said bulbs upon the opposite sides of the front portion of the face.

15. In a lipstick testing device, in combination, a cabinet having a front wall with a sight opening through it dimensioned to expose the front of a face looking into the cabinet through this opening, a flat mirror within the cabinet and spaced rearwardly from its front wall a distance such that an image of the face will be visible therein upon looking into the cabinet through said sight opening, an internally unreflective sight tube extending forwardly from said mirror and terminating in spaced relation rearwardly of said front wall, said tube being in alignment with said sight opening, and inner frame member providing through it a sight opening forming a forward continuation of said sight tube, said frame member having therein an upwardly open slotted pocket extended below and beyond each side of its said sight opening and spaced rearwardly from said front wall, said pocket being adapted to form a slideway, a transparent testing slide plate adapted to be removably and replaceably held in said slideway pocket so that the human face looking through said aligned sight openings will then be in proximity to this plate, and a pictured lip representation carried upon one of the surfaces of said plate and disposed in a position thereon for adapting it to form the lips of the reflected face image, said inner frame member being spaced rearwardly from said front wall and thereby providing lateral light openings at the rear of the sight opening in the latter, a vertically elongated cylindrical electric light bulb within the cabinet laterally outward from each of said light openings, and a reflector for each of said bulbs adapted to direct the light therefrom through said light openings and through the sight opening of said front wall upon the opposite sides of the front portion of the face.

PALMER BEVIS.